United States Patent [19]

Kruse

[11] Patent Number: 4,871,030
[45] Date of Patent: Oct. 3, 1989

[54] FARM IMPLEMENT HAVING TRANSPORT WHEELS AND SOIL WORKING ROLLERS ON ROTATING FRAME

[75] Inventor: Oliver M. Kruse, Menasha, Wis.

[73] Assignee: Brillion Iron Works, Inc., Menasha, Wis.

[21] Appl. No.: 304,719

[22] Filed: Jan. 31, 1989

[51] Int. Cl.4 ............................................. A01B 63/22
[52] U.S. Cl. .................................. 172/397; 172/413; 172/478
[58] Field of Search ............... 172/397, 413, 466, 322, 172/323, 478, 479

[56] References Cited

U.S. PATENT DOCUMENTS

| | | | |
|---|---|---|---|
| 2,635,888 | 4/1953 | Bailiff | 172/413 X |
| 2,938,588 | 5/1960 | Stein | 172/413 X |
| 2,970,658 | 2/1961 | Kopaska | 172/397 X |
| 4,269,273 | 5/1981 | Colville | 172/397 |
| 4,534,416 | 8/1985 | Johnson | 172/413 |

Primary Examiner—Richard J. Johnson
Attorney, Agent, or Firm—Bayard H. Michael

[57] ABSTRACT

The farm implement drawbar is provided with a transverse frame which is pivotally mounted at the rear of the drawbar for movement between a working position and a transport position. The ground engaging rollers are mounted on the frame while separate transport wheels are also fixed to the frame. When the hydraulic ram is actuated to pivot the frame between the work position and the transport position the transport wheels and the earth working wheels move with the frame as a unit.

9 Claims, 2 Drawing Sheets

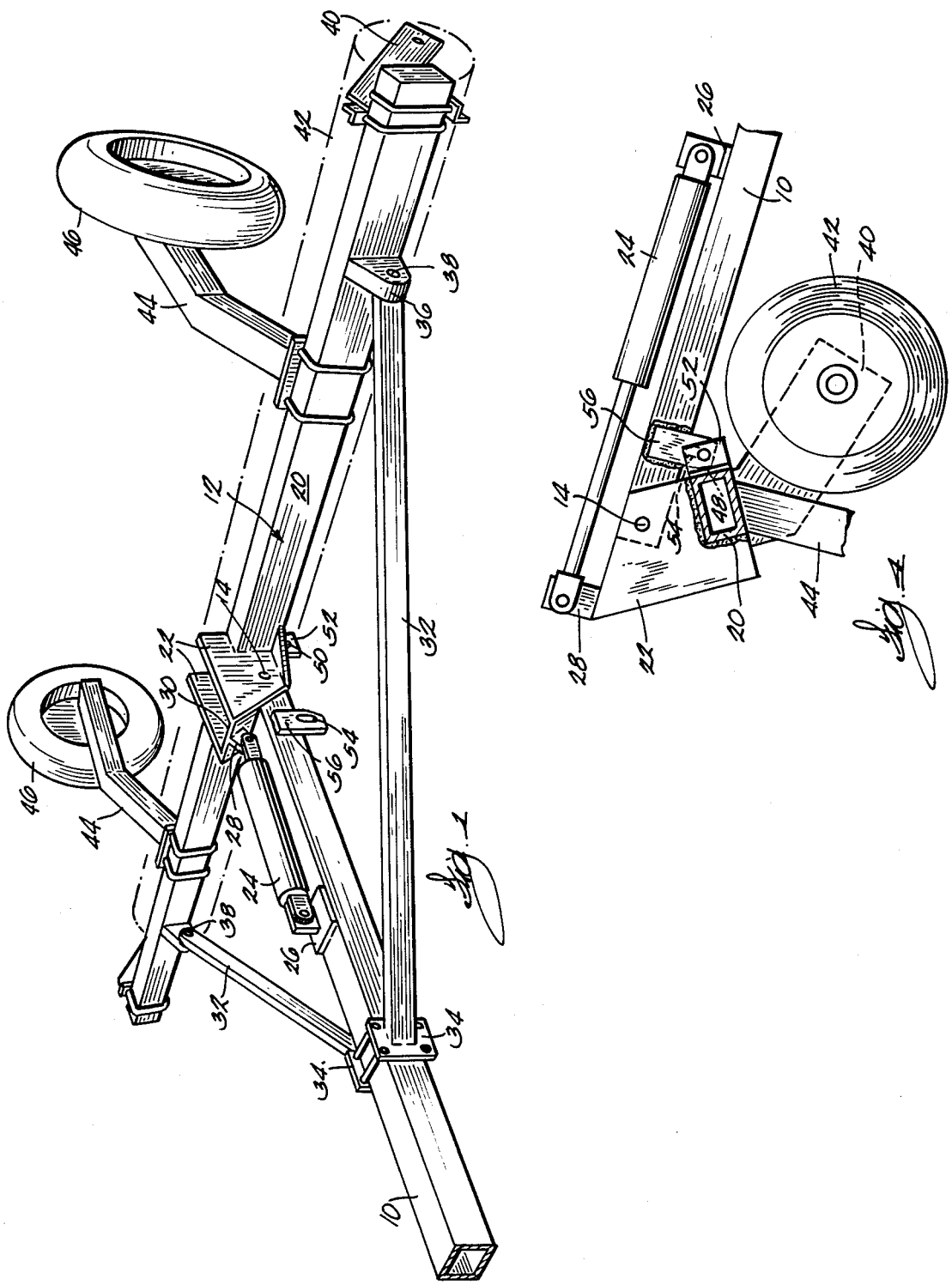

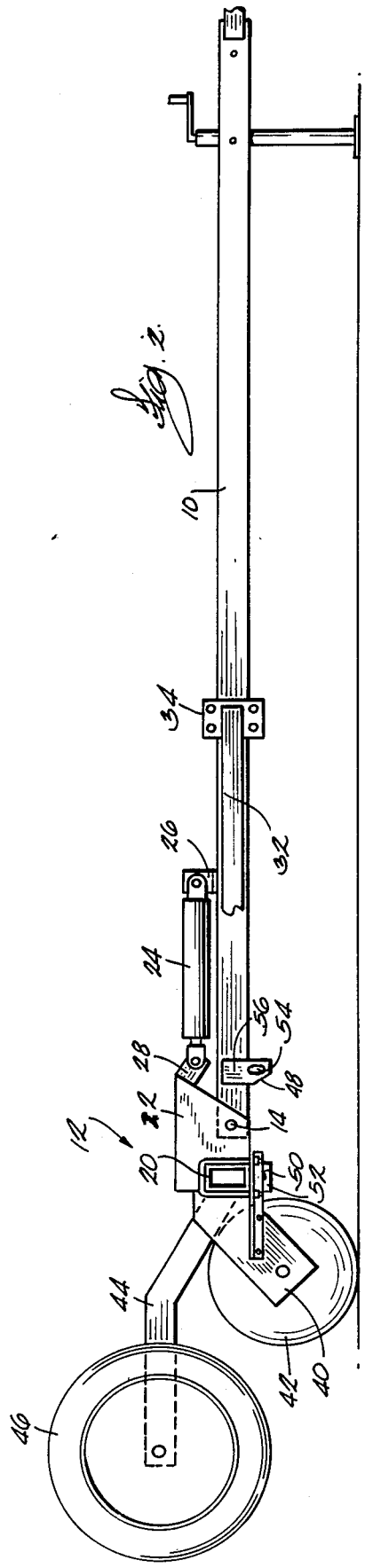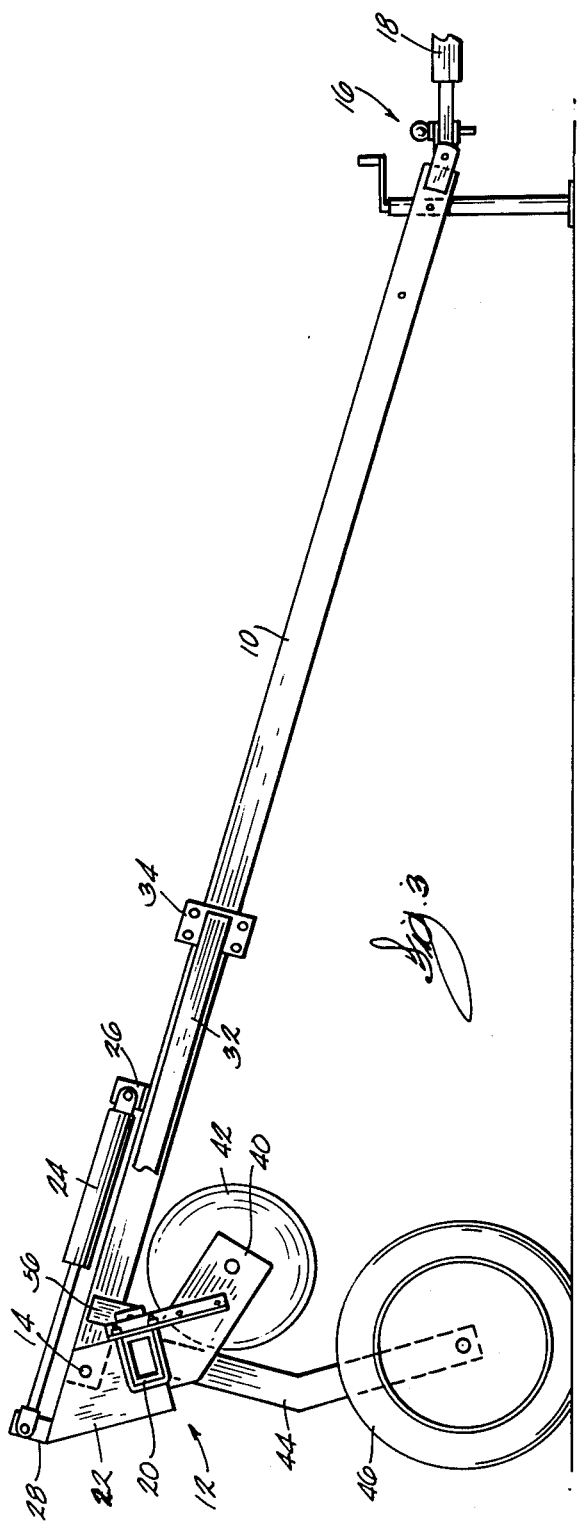

FARM IMPLEMENT HAVING TRANSPORT WHEELS AND SOIL WORKING ROLLERS ON ROTATING FRAME

BACKGROUND OF THE INVENTION

Most farm implements have a rather significant length so that a single set of transport wheels can readily be located near the center of gravity. This provides a reasonably well balanced machine with only minor vertical loads carried by the drawbar and transferred to the tractor hitch during transport. A pulverizer or similar machine, has its weight distributed over a very short length so the center of gravity is over the soil-engaging components (rollers). Transport wheels are not easily located at such a point. As a result, positioning these wheels behind the center of gravity results in a high drawbar hitch weight during transport. Though this is the conventional approach, objectionable vertical loads can be applied to the front implement when machines are pulled in tandem such as a pulverizer behind a grain drill. Likewise, wheels in front of the center of gravity cause a large negative hitch weight.

SUMMARY OF THE INVENTION

The present invention overcomes the problems of the past designs by providing a farm implement having a drawbar to which there is affixed a transverse frame which supports both the transport wheels and the soil engaging components (rollers or discs). The frame is pivotally connected to the drawbar and a hydraulic ram actuates the frame to pivot between a working position with the rollers or discs engaging the ground and a transport position in which the transport wheels are pivoted around the frame axis to engage the ground while at the same time raising the earth working rollers. The transport wheels engage the ground just slightly to the rear of the center of gravity of the implement and therefore the drawbar weight is quite satisfactory. When the transport wheels are elevated and the rollers are in engagement with the ground, the wheels engage the ground somewhat to the rear of the point where the rollers engage the ground. This results in maximizing proper loading of the packer rollers without unduly loading the trailer hitch either positively or negatively.

BRIEF DESCRIPTION OF THE DRAWINGS

FIG. 1 is a perspective view of the implement with the transport wheels elevated in the working position of the implement. The drawbar has been broken off.

FIG. 2 is a side elevation of the farm implement with the wheel supporting frame in the working position and the earth working rollers or discs in engagement with the ground.

FIG. 3 is similar to FIG. 2 but shows the transport wheels in engagement with the ground which results in the earth working rollers being tucked up underneath the frame as shown.

FIG. 4 is a detailed view with parts broken away to show the manner in which a lock pin can be inserted to keep the parts in the transport position.

DETAILED DESCRIPTION OF THE DRAWINGS

The farm implement shown in the drawings is simplicity in itself in that the drawbar 10 is provided with a transverse frame 12 pivotally connected at 14 to the rear of the drawbar. The front of the drawbar is provided with a hitch 16 for connection to a towing vehicle 18 (only the hitch of the towing vehicle being shown).

The frame 12 has a rectangular tube 20 with spaced mounting brackets 22, 22 welded thereto to fit over the rear of the drawbar 10 to permit the pivot pin 14 to be passed through the brackets 22 and the drawbar 10. Hydraulic ram 24 has one end connected to bracket 26 welded on the drawbar while the piston rod is connected to pad 28 mounted on web 30 between brackets 22, 22. The ram controls pivotal movement of the frame about the axis of pivot 14.

A brace 32 is provided on each side of the drawbar with the front end of each brace being welded to the pad 34 and the rear of each brace is pivotally connected to ears 36 on the frame. The axis of each pivot 38 is aligned with the axis of pivot 14 to enable pivotal movement of the frame.

At each end of the frame there is a support bracket 40 which pivotally supports the earth rollers or discs 42 which are designed to work and pulverize the earth as the implement is towed over the ground. The rollers 42 are shown in engagement with the ground in FIG. 2. Frame 12 also supports two wheel arms 44 adjustably bolted along the length of the frame and each wheel arm supports a wheel 46. When the earth rollers are in engagement with the ground as illustrated in FIG. 2, i.e., when the frame is in its work position, the transport wheels 46 are raised and are behind the rollers or discs. This position of the transport wheels during working in effect adds weight to the working wheels without adding to the drawbar load. As a matter of fact, it counteracts the drawbar load and reduces the load on the drawbar. This is conventional.

When the hydraulic ram 24 is actuated, the frame 12 and rollers 42 and transport wheels 46 fixed thereto pivot about the pivot axis 14 until the frame swings around to the position shown in FIG. 3 in which position frame tube 20 may engage the beveled surface 48 of bracket 56 welded to the side of the drawbar 10; normally it does not engage. At this time, a lock pin can be mounted in hole 50 in bracket 52 and the elongated hole 54 in bracket 56 welded on the drawbar. This will prevent the transport wheels getting moved out from under the rig during transport or during storage (during which time there could, of course, be no hydraulic pressure keeping the ram elongated).

This design greatly reduces a number of Parts. There is a considerable reduction in moving parts. The frame rotation can be tailored to meet particular needs and drawbar hitch weight. When the assembly is in the position shown in FIG. 3, it takes a lot less space from front to back than the prior art arrangements. This simplifies storage. Also, the spacing between the transport wheels is easily adjusted by sliding the arms along the frame.

I claim:
1. A farm implement comprising
   a drawbar having a front and rear end,
   a hitch on said front end for connection with a towing vehicle,
   a transverse frame pivotally connected to said rear end of said drawbar for pivotal movement between a work position and a transport position, said pivotal movement being about an axis substantially normal to said drawbar,
   means supporting earth working rollers on said frame for engagement with the earth when said frame is in said work position, said rollers supporting said frame when said frame is in said work position, a plurality of wheel arms fixed on said frame, a wheel rotatably mounted on each wheel arm, said wheels being elevated when said frame is in said work position and being in engagement with the earth when said frame is in said transport position.

2. A farm implement according to claim 1 including a hydraulic ram connected between said drawbar and said frame to pivot said frame between said positions.

3. A farm implement according to claim 1 in which said wheels engage the earth generally below and slightly to the rear of the center of gravity of the farm implement.

4. A farm implement according to claim 3 in which said transport wheels are above and behind said rollers when said frame is in said work position.

5. A farm implement comprising, a drawbar having a front and a rear end, a hitch on said front end for connection with a towing vehicle, a transverse frame pivotally connected to said rear end of said drawbar, diagonal braces interconnecting said drawbar and each side of said frame, the pivotal connections of said braces to said frame being aligned with the pivotal connection of said drawbar to said frame to allow the frame to pivot between a work position and a transport position, support arms fixed on said frame, earth working rollers rotatably mounted on said arms to support said frame and engage the earth when said frame is in said work position, a plurality of transport arms fixed on said frame, a transport wheel rotatably mounted on each transport arm, said wheels being elevated when said frame is in said work position and being in engagement with the earth when said frame is in said transport position.

6. A farm implement according to claim 5 in which said transport wheels engage the earth generally below and slightly to the rear of the center of gravity of the farm implement.

7. A farm implement according to claim 5 including a hydraulic ram connected between said drawbar and said frame to pivot said frame between said positions.

8. A farm implement comprising, a drawbar, a hitch on the front of said drawbar, a transverse frame pivotally connected to a transverse horizontal pivot at the rear of said drawbar, diagonal braces connected to said drawbar and to a pivot connection at each side of said frame, the pivotal connections of said braces to said frame being aligned with the pivotal connection of said drawbar to said frame to allow the frame to pivot between a work position and a transport position, earth working rollers rotatably mounted on said frame engaging the earth and supporting said frame when said frame is in said work position, and a plurality of transport wheels fixed on said frame, said wheels being raised above the earth when said frame is in said work position and being in engagement with the earth when said frame is in said transport position.

9. A farm implement comprising a drawbar, a hitch on the front end of said drawbar, a transverse frame pivotally connected to a transverse horizontal pivot the rear end of said drawbar for movement between a work position and a transport position, a hydraulic ram acting between said frame and said drawbar to move the frame about said pivot between said positions, means supporting earth working rollers on said frame for engagement with the earth when said frame is in said work position, a plurality of wheels fixed on said frame, said wheels being elevated when said frame is in said work position and being in engagement with the earth when said frame is in said transport position, said rollers supporting said frame when said rollers are in said work position.

* * * * *